US012812017B2

(12) United States Patent
S et al.

(10) Patent No.: US 12,812,017 B2
(45) Date of Patent: Nov. 24, 2026

(54) CLOUD-BASED COMMISSIONING SYSTEM

(71) Applicant: Schneider Electric USA, Inc., Boston, MA (US)

(72) Inventors: Naresh S, Karnataka (IN); Arvind Kumar Sharma, Karnataka (IN); Munikrishna Bojji, Karnataka (IN); Shreesh Agarwal, Karnataka (IN)

(73) Assignee: Schneider Electric USA, Inc., Boston, MA (US)

( * ) Notice: Subject to any disclaimer, the term of this patent is extended or adjusted under 35 U.S.C. 154(b) by 130 days.

(21) Appl. No.: 18/813,741

(22) Filed: Aug. 23, 2024

(65) Prior Publication Data

US 2026/0059026 A1 Feb. 26, 2026

(51) Int. Cl.
*G06F 13/00* (2006.01)
*H04L 67/10* (2022.01)
*H04L 67/565* (2022.01)

(52) U.S. Cl.
CPC ............ *H04L 67/565* (2022.05); *H04L 67/10* (2013.01)

(58) Field of Classification Search
CPC ........ H04L 67/565; H04L 67/10; H04L 69/08
USPC ............... 709/232, 230, 222, 220, 201, 202, 709/217–219
See application file for complete search history.

(56) References Cited

U.S. PATENT DOCUMENTS

| | | | | |
|---|---|---|---|---|
| 10,443,357 | B2 | 10/2019 | Weatherhead et al. | |
| 10,826,717 | B2 * | 11/2020 | Bhat | G06F 8/65 |
| 11,134,556 | B2 | 9/2021 | Vangeel et al. | |
| 11,516,185 | B2 * | 11/2022 | Scali | H04L 41/28 |
| 11,843,609 | B2 | 12/2023 | Verberkt et al. | |
| 12,050,017 | B2 * | 7/2024 | Khan | F24F 11/48 |
| 2015/0369013 | A1 | 12/2015 | Weatherhead et al. | |
| 2020/0084864 | A1 | 3/2020 | Klecha et al. | |
| 2022/0294767 | A1 | 9/2022 | Scali et al. | |
| 2023/0280059 | A1 * | 9/2023 | Khan | F24F 11/58 700/276 |
| 2024/0019269 | A1 | 1/2024 | Kagan et al. | |

FOREIGN PATENT DOCUMENTS

EP 3276887 A1 1/2018

OTHER PUBLICATIONS

Sun Changqing et al: "Design and Development of Modbus/MQTT Gateway for Industrial IoT Cloud Applications Using Raspberry Pi", 2019 Chinese Automation Congress (CAC), IEEE, Nov. 22, 2019, pp. 2267-2271.

* cited by examiner

*Primary Examiner* — Kenneth R Coulter
(74) *Attorney, Agent, or Firm* — Stinson LLP

(57) ABSTRACT

A cloud-based commissioning system enables remote commissioning of smart devices located at a site network. The system includes a cloud-based commissioning application that receives a commissioning request from a user using a device remote from the site network, and generates a cloud-based commissioning request. An agent is installed on a central server of the network site. The agent receives the cloud-based commissioning request from the cloud-based commissioning application, converts the cloud-based commissioning request to a protocol-specific commissioning request, and sends the protocol-specific commissioning request to a device layer of the network site. The device layer includes at least one smart device.

20 Claims, 4 Drawing Sheets

CLOUD-BASED COMMISSIONING SYSTEM

FIELD OF THE DISCLOSURE

The present disclosure generally relates to a cloud-based commissioning system to enable cloud-based commissioning of smart devices and systems.

BACKGROUND OF THE DISCLOSURE

A commissioning application, in the context of software development or engineering, is a tool or software platform used to facilitate the commissioning process for various systems or devices. This application assists in the setup, configuration, testing, and deployment of equipment or software systems, ensuring that they are installed correctly and perform as expected. For example, the commissioning application may provide tools for configuring and customizing the settings of the systems or devices being commissioned. This may include setting parameters, defining user roles and permissions, and configuring communication protocols. The tool may also offer functionality for testing the systems or smart devices to ensure that they function correctly and meet the specified requirements. This may involve running diagnostic tests, simulating real-world scenarios, and verifying performance metrics. As an example, a commissioning application may be used to set up and commission smart electrical panels, each may include circuit breakers, power meters, energy meters, and sensors.

SUMMARY OF THE DISCLOSURE

Features of a cloud-based commissioning system to enable cloud-based commissioning of smart devices and systems are described and shown herein.

In one aspect, a method comprising comprises receiving, using an agent installed on a central server of a network site, a cloud-based commissioning request from a cloud-based commissioning application; converting, using the agent, the cloud-based commissioning request to a protocol-specific commissioning request; and sending the protocol-specific commissioning request to a device layer of the network site, wherein the device layer includes at least one smart device.

In another aspect, a cloud-based commissioning system for remotely commissioning smart devices located at a site network comprises a cloud-based commissioning application configured to (i) receive a commissioning request from a user using a device remote from the site network, and (ii) generate a cloud-based commissioning request. An agent is installed on a central server of the network site. The agent is configured to: (i) receive the cloud-based commissioning request from the cloud-based commissioning application; (ii) convert the cloud-based commissioning request to a protocol-specific commissioning request; and (iii) send the protocol-specific commissioning request to a device layer of the network site, wherein the device layer includes at least one smart device.

In yet another aspect, a non-transitory computer-readable medium stores computer-executable instructions to enable communication between a cloud-based commissioning application and a device layer of a network site including at least one smart device for use in cloud-based commissioning of the at least one smart device. The computer-executable instructions include instructions that instruct at least one processor to: receive a cloud-based commissioning request from the cloud-based commissioning application; convert the cloud-based commissioning request to a protocol-specific commissioning request; and send the protocol-specific commissioning request to the device layer of the network site.

DETAILED DESCRIPTION OF THE DISCLOSURE

Presently, commissioning applications are employed to facilitate commissioning of smart devices and systems. These commissioning applications are locally installed on a computing device that is connected to the local network (i.e., a desktop application or native application), and the applications are run in the desktop window. Typically, when launching new local commissioning applications, there is a slow time to market due to the requirement of tight coupling between the software and the smart device firmware. The local commissioning applications are developed for specific operating systems, such as Windows, macOS, or Linux. This means that separate versions of the commissioning application need to be developed and maintained for each platform, leading to increased development time and cost. In addition, users must manually update local commissioning applications to receive the latest features and security patches, which can be cumbersome and time-consuming. Further, local commissioning applications are tied to the computing device on which they are installed, limiting accessibility for users who need to access the application from multiple devices or locations.

The present disclosure relates to a cloud-based commissioning system to enable cloud-based commissioning of smart devices and systems—rather than local commissioning applications—thus eliminating the above limitations inherent with the use of local commissioning applications. In particular, the present disclosure relates to the use of cloud-based commissioning applications to remotely commission smart devices and systems at a client site. The disclosed cloud-based commissioning system enables the commissioning applications to be run on any device having a web browser irrespective of the operating system. This means users can access the cloud-based commissioning applications from desktops, laptops, tablets, smartphones and other mobile devices without needing to install separate versions for each platform. Because the cloud-based commissioning applications are accessed through a web browser, users can access them from an external network remote from the smart device network site. Further, updates and new features can be deployed centrally on the web server, eliminating the need for users to manually download and install updates. This makes it easier for developers to roll out changes quickly and ensures that users are always accessing the latest version of the commissioning application. Other advantages of the cloud-based commissioning system will become apparent from the below description.

Figure 1:
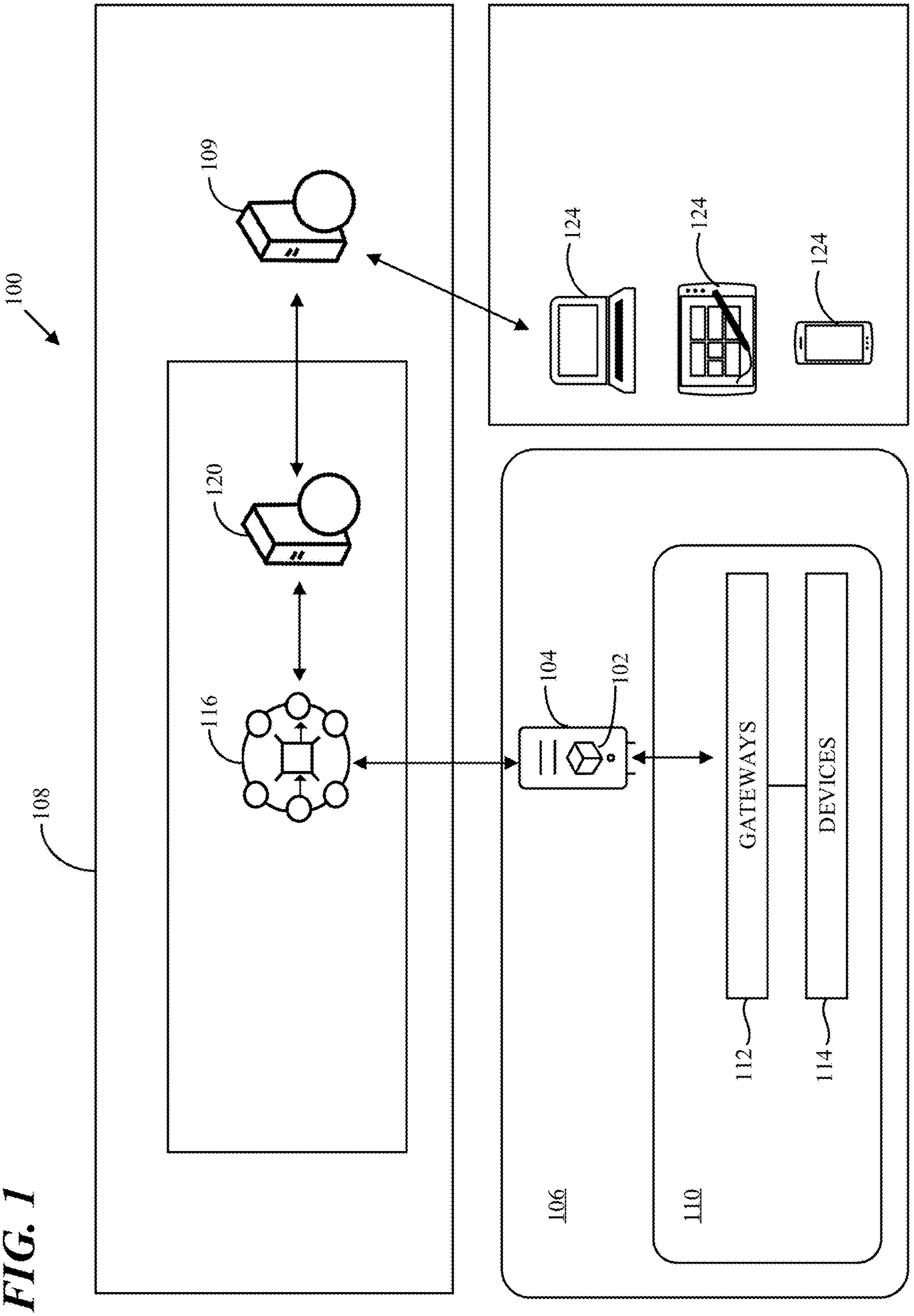
FIG. 1 is a schematic illustration of architecture of one embodiment of a cloud-based commissioning system.

Referring to FIG. 1, architecture of a cloud-based commissioning system is illustrated schematically and indicated at reference numeral 100. The cloud-based commissioning system 100 includes an agent 102 (e.g., daemon service software) installed on a central server 104 of a site network 106 (e.g., client site network). The agent 102 is a collection of native protocol implementation that acts as a bridge for communication between a remote enterprise cloud computing platform 108 (e.g. a third party enterprise cloud) hosting a cloud-based commissioning application 109, and a smart device layer 110 (e.g., edge layer) of the site network 106. In the illustrated embodiment, the smart device layer 110 includes one or more gateways 112 or servers (e.g., edge gateways) connected to smart devices 114 (e.g., edges devices). In the illustrated embodiment, the enterprise cloud 108 includes a broker 116 for handling communications between the agent 102 and one or more cloud-based commissioning applications 109 hosted on a commissioning platform service 120 within the enterprise cloud 108. The commissioning application 109 enables communication with one or more remote computing devices 124, such as but not limited to laptops, tablets, or smartphones. A site engineer or other user employs the remote computing devices 124 to commission the smart device and systems without requiring direct connection to the site network 106.

Figure 2:
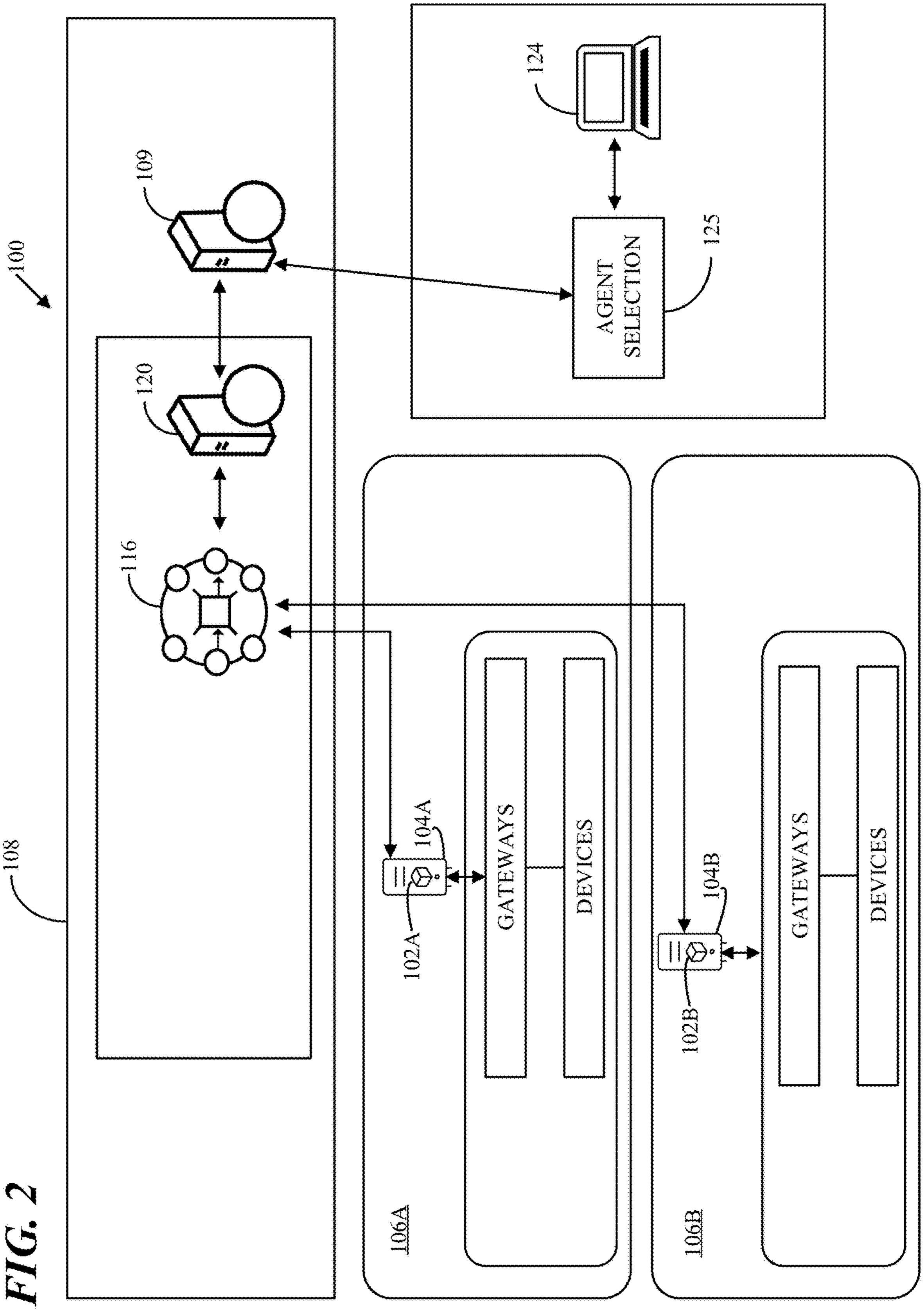
FIG. 2 is schematic illustration of architecture of another embodiment of the cloud-based commissioning system.

Referring to FIG. 2, in one or more embodiments, more than one site network 106A, 106B for the same client may be included in a cloud-based commissioning system. In this example, each site network 106A, 106B includes a dedicated agent 102A, 102B downloaded to a corresponding central server 104A, 104B. Each agent 102A, 102B is in communication with the broker 116 of the enterprise cloud 108. Further, the user (e.g., site engineer) is able to select the applicable agent 102A, 102B for the selected network 106A, 106B on the remote computing device 124, as shown by reference numeral 125.

Figure 3:
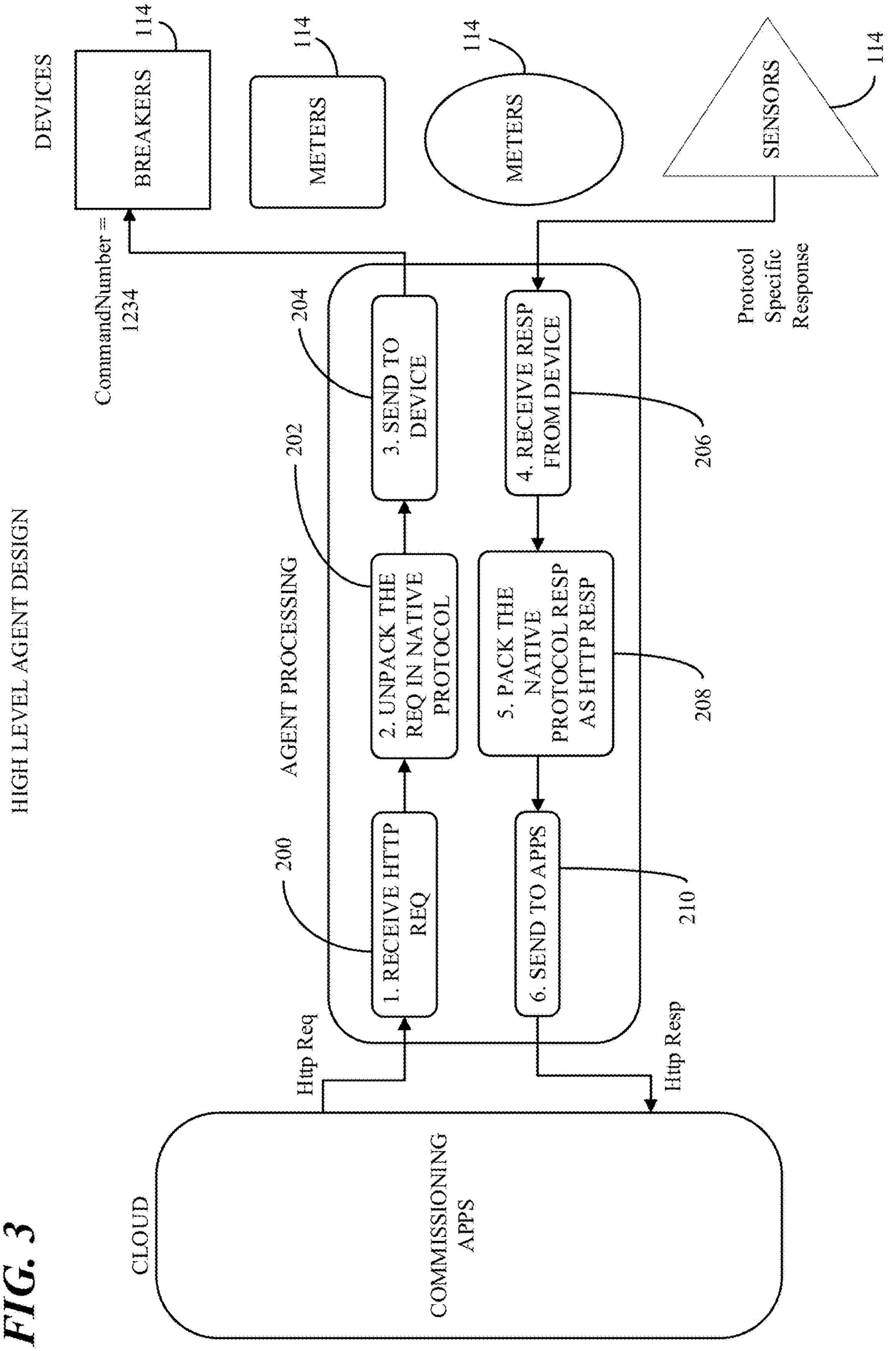
FIG. 3 is high level schematic of an agent of the cloud-based commissioning system.

Referring to FIG. 3, a high level schematic of operation of the agent 102 is shown. At block 200, the agent 102 receives, from the cloud-based commissioning platform 120, a cloud-based device request (e.g., HTTP request) for commissioning smart devices 114 on a site network 106. The cloud-based device request is generated by user input using the remote computing device 124. At block 202, the agent 102 converts the cloud-based device request to native device-specific protocol (e.g., Modbus). For example, the agent 102 unpacks (i.e., extracts or parses) the data from the HTTP request, and converts the request data so that it can be sent to and read by the smart devices (e.g., Modbus protocol). At block 204, the protocol-specific device request is communicated to the smart devices 114, either directly or through server(s) or gateway(s). As shown in FIG. 3, in one example the smart devices 114 may include circuit breakers, meters, and/or sensors. After processing the protocol-specific device request, the smart devices 114 generate protocol-specific device responses. At block 206, the agent 102 receives the protocol-specific device responses from the smart devices 114. At block 208, the agent 102 converts the response data in the protocol-specific device responses so that it can be sent to and read by the cloud-based application in the cloud-based commissioning platform 120. At block 210, the agent 102 communicates the cloud-based device response to the cloud-based commissioning platform 120.

The agent 102 is the key to cloud-based commissioning of smart devices by enabling communication between the cloud-based commissioning applications and the device layer. The use of the agent 102 has the advantages of a one-time installation on the central server of the site network, enablement of commissioning and testing of the smart devices in a web browser, operating independent of operating system and platform, and automatic updating of web application over the cloud.

Figure 4:
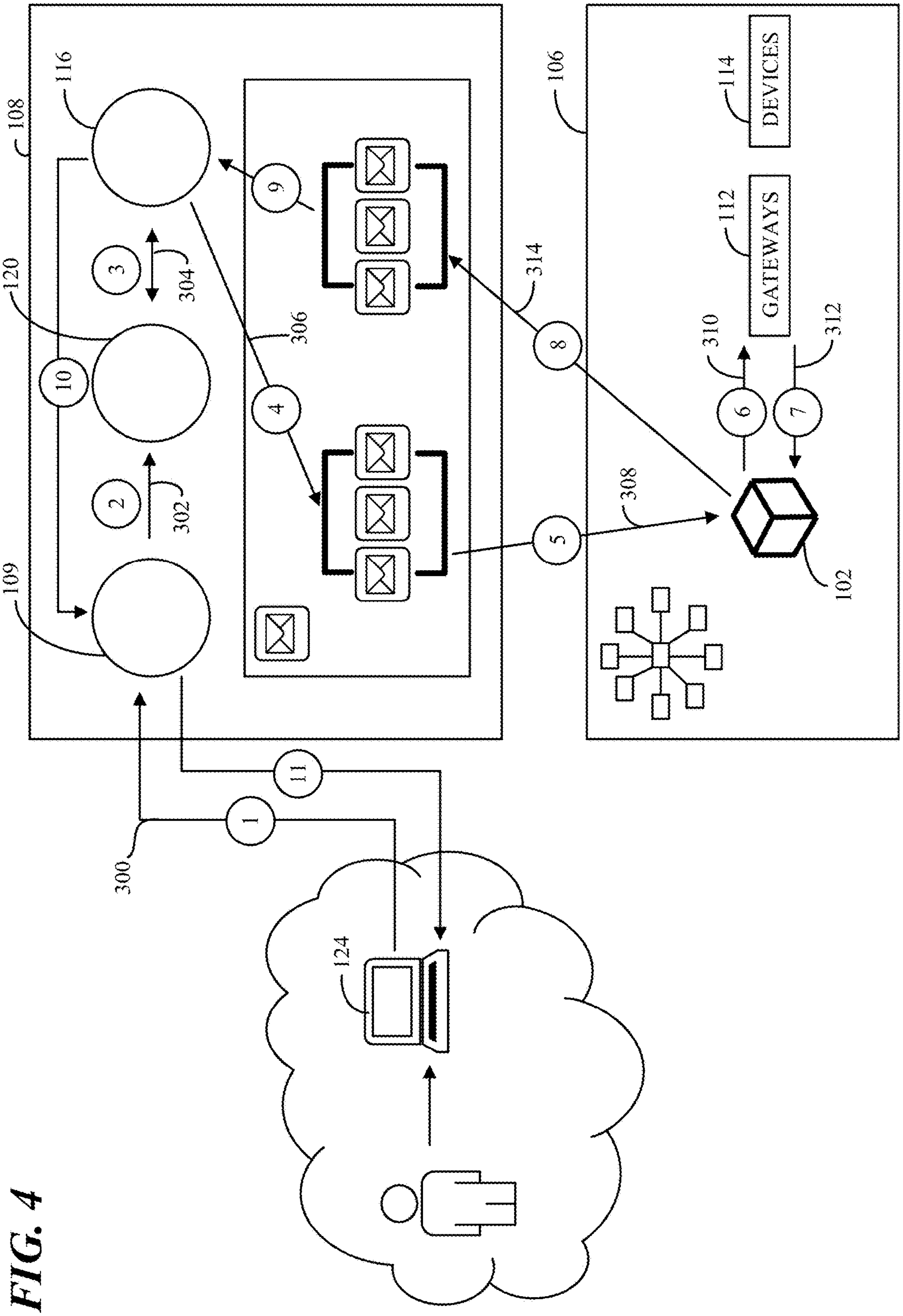
FIG. 4 is a data flow diagram (DFD) illustrating data flowing through an example of the cloud-based commissioning system.

Referring to FIG. 4, a data flow diagram (DFD) illustrates data flowing through an example of a cloud-based commissioning system. Initially, the user inputs a device request via a user interface of a web client. At arrow 300, the web client communicates the device request to the web server for processing. At arrow 302, the web server processes the device request and forwards the processed request data to the commissioning platform service. At arrow 304, the request is delivered to the broker 116. In one example, the broker 116 converts the request data to a schema that is readable by the agent 102. For example, the broker may convert the request data to JSON Schema. After conversion, the request data is sent to the agent 102 via a messaging service, such as Azure Service Bus. In the illustrated embodiment, the messaging service (e.g., Azure Service Bus) uses a publish-subscribe pattern including topics to which publishers (senders) send messages, and subscribes (receivers) create subscriptions to the topic to receive the messages. At arrow 306, the commissioning platform service publishes the request data to an agent topic within the messaging service, thereby sending the request data to the agent topic. The agent 102 is subscribed to the agent topic, thereby, at arrow 308, the agent 102 receives the published request data from the agent topic. The agent 102 converts the device request data schema (e.g., JSON Schema) to a protocol-specific device request (e.g., Modbus), and at arrow 310, sends the device request to the device layer (e.g., to the gateway or server connected to the edge devices 114).

Referring still to FIG. 4, in response to the device request, at arrow 312, the smart device 124 sends a protocol-specific device response to the agent 102. The agent 102 converts the response data in the protocol-specific device response to a computer-readable data interchange format schema (e.g., JSON Schema). The agent 102 communicates the response data to the cloud-based commissioning platform 120 via the messaging service. In the illustrated embodiment, at arrow 314, the agent 102 publishes the response data to a broker topic within the messaging service, thereby sending the response data to the broker topic. The broker 116 is subscribed to the broker topic, thereby, at arrow 316, the broker receives the published response data from the broker topic. At arrow 320, the broker 116 updates the cloud-based commissioning application with the response data, which is communicated to the user via the user interface of the mobile device 124.

Having described the invention in detail, it will be apparent that modifications and variations are possible without departing from the scope of the invention defined in the appended claims.

Embodiments of the present disclosure comprise a special purpose computer including a variety of computer hardware, as described in greater detail herein and are operational with other special purpose computing system environments or configurations even if described in connection with an example computing system environment. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices. For purposes of illustration, programs and other executable program components may be shown as discrete blocks. It is recognized, however, that such programs and components reside at various times in different storage components of a computing device, and are executed by a data processor(s) of the device.

In operation, processors, computers, and/or servers may execute the processor-executable instructions (e.g., software, firmware, and/or hardware) such as those illustrated herein to implement aspects of the invention. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the present disclosure.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A method comprising:

receiving, using an agent installed on a central server of a network site, a cloud-based commissioning request from a cloud-based commissioning application, wherein the cloud-based commissioning request is in a computer-readable data interchange format schema;

converting, using the agent, the cloud-based commissioning request from the computer-readable data interchange format schema to a protocol-specific commissioning request; and sending the protocol-specific commissioning request to a device layer of the network site, wherein the device layer includes at least one smart device.

2. The method set forth in claim 1, further comprising:

receiving, at the device layer, the protocol-specific commissioning request; and generating, at the device layer, a protocol-specific commissioning response in response to said receiving the protocol-specific commissioning request.

3. The method set forth in claim 2, further comprising:

receiving, using the agent, the generated protocol-specific commissioning response;

sending, using the agent, the protocol-specific commissioning response to the cloud-based commissioning application.

4. The method set forth in claim 3, further comprising:

converting, using the agent and before sending the protocol-specific commissioning response, the protocol-specific commissioning response to the computer-readable data interchange format schema.

5. The method set forth in claim 1, wherein said receiving the cloud-based commissioning request comprises subscribing the agent to an agent topic within a messaging service so that the agent retrieves the cloud-based commissioning request via the messaging service.

6. The method set forth in claim 1, wherein said at least one smart device includes at least one of a breaker, a meter, and a sensor.

7. The method set forth in claim 1, further comprising:

generating, at a site remote from the network site, the cloud-based commissioning request using the cloud-based commissioning application.

8. The method set forth in claim 7, wherein said generating the cloud-based commissioning request is generated using a cloud-based broker, wherein the cloud-based broker communicates with the agent.

9. The method set forth in claim 8, wherein the cloud-based broker and the agent communicate with one another via a messaging service.

10. A cloud-based commissioning system for remotely commissioning smart devices located at a network site comprising:

a cloud-based commissioning application configured to (i) receive a commissioning request from a user using a device remote from the site network, and (ii) generate a cloud-based commissioning request in a computer-readable data interchange format schema; and an agent installed on a central server of the network site, wherein the agent is configured to: (i) receive the cloud-based commissioning request from the cloud-based commissioning application; (ii) convert the cloud-based commissioning request from the computer-readable data interchange format schema to a protocol-specific commissioning request; and (iii) send the protocol-specific commissioning request to a device layer of the network site, wherein the device layer includes at least one smart device.

11. The cloud-based commissioning system set forth in claim 10, wherein the cloud-based commissioning application and the agent communicate with one another via a messaging service.

12. The cloud-based commissioning system set forth in claim 10, further comprising a cloud-based broker in communication with the agent, wherein the cloud-based broker is configured to enable communication between the cloud-based commissioning application and the agent.

13. The cloud-based commissioning system set forth in claim 12, wherein the cloud-based commissioning application and the agent communicate with one another via a messaging service.

14. The cloud-based commissioning system set forth in claim 10, further comprising the device layer.

15. The cloud-based commissioning system set forth in claim 14, wherein the at least one smart device of the device layer includes at least one of a breaker, a meter, and a sensor.

16. The cloud-based commissioning system set forth in claim 14, wherein the device layer further includes a gateway in communication with the at least one smart device, wherein the agent communicates with the gateway.

17. A non-transitory computer-readable medium storing computer-executable instructions to enable communication between a cloud-based commissioning application and a device layer of a network site including at least one smart device for use in cloud-based commissioning of the at least one smart device, the computer-executable instructions including instructions that instruct at least one processor to:

receive a cloud-based commissioning request from the cloud-based commissioning application, wherein the cloud-based commissioning request is in a computer-readable data interchange format schema;

convert the cloud-based commissioning request from the computer-readable data interchange format schema to a protocol-specific commissioning request; and send the protocol-specific commissioning request to the device layer of the network site.

18. The non-transitory computer-readable medium set forth in claim 17, wherein the computer-executable instructions further include instructions that instruct the at least one processor to:

receive a generated protocol-specific commissioning response from the device layer, wherein the generated protocol-specific commissioning response is generated by the device layer in response to receiving the protocol-specific commissioning request from an agent installed on a central server of the network site; and send the protocol-specific commissioning response to the cloud-based commission application.

19. The non-transitory computer-readable medium set forth in claim 18, wherein the computer-executable instructions further include instructions that instruct the at least one processor to:

convert the protocol-specific commissioning response to the computer-readable data interchange format schema before sending the protocol-specific commissioning response to the cloud-based commissioning application.

20. The non-transitory computer-readable medium set forth in claim 18, wherein the computer-executable instructions further include instructions that instruct the at least one processor to communicate with the cloud-based commissioning application via a messaging service.

* * * * *